(12) United States Patent
Adetola et al.

(10) Patent No.: US 11,841,182 B2
(45) Date of Patent: Dec. 12, 2023

(54) COORDINATION OF REFRIGERATED STORAGE CONTAINERS

(71) Applicant: CARRIER CORPORATION, Jupiter, FL (US)

(72) Inventors: Veronica Adetola, West Hartford, CT (US); Dong Luo, South Windsor, CT (US); Hayden M. Reeve, West Hartford, CT (US); Craig R. Walker, South Glastonbury, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 1252 days.

(21) Appl. No.: 16/335,162

(22) PCT Filed: Oct. 12, 2017

(86) PCT No.: PCT/US2017/056316
§ 371 (c)(1),
(2) Date: Mar. 20, 2019

(87) PCT Pub. No.: WO2018/071652
PCT Pub. Date: Apr. 19, 2018

(65) Prior Publication Data
US 2019/0277558 A1    Sep. 12, 2019

Related U.S. Application Data

(60) Provisional application No. 62/407,301, filed on Oct. 12, 2016.

(51) Int. Cl.
*F25D 29/00* (2006.01)
*B60H 1/00* (2006.01)
(Continued)

(52) U.S. Cl.
CPC ....... *F25D 29/003* (2013.01); *B60H 1/00657* (2013.01); *B65D 88/745* (2013.01);
(Continued)

(58) Field of Classification Search
CPC ...... F25D 29/003; F25D 11/003; F25D 29/00; F25D 13/02; F25D 13/04; F25D 17/00;
(Continued)

(56) References Cited

U.S. PATENT DOCUMENTS 4,663,725 A    5/1987   Truckenbrod et al.
4,885,564 A   12/1989   Vercellotti et al.
(Continued)

FOREIGN PATENT DOCUMENTS

CN    101003323 A    7/2007
CN    105051777 A   11/2015
(Continued)

OTHER PUBLICATIONS

Hamburg Suedamerikanishche, "Stay cool-We care", Retrieved on Aug. 22, 2016 <http://www.hamburgsud.com/group/media/sharedmedia/dokumente/brochures/Reefer_guide.pdf>, 46 pages.
(Continued)

*Primary Examiner* — Florian M Zeender
*Assistant Examiner* — Milena Racic
(74) *Attorney, Agent, or Firm* — CANTOR COLBURN LLP

(57) ABSTRACT

A system is provided and includes refrigerated storage containers (20), local controllers (30) respectively coupled with corresponding refrigerated storage containers (20) to control operations thereof in accordance with controller parameters and a supervisory controller (40). The supervisory controller (40) is configured to issue control commands
(Continued)

to the local controllers (30) based on respective responses of the refrigerated storage containers (20) to local controller control.

9 Claims, 6 Drawing Sheets

(51) Int. Cl.
  *B65D 88/74* (2006.01)
  *F25D 11/00* (2006.01)
  *G06Q 10/08* (2023.01)
(52) U.S. Cl.
  CPC ........... *F25D 11/003* (2013.01); *G06Q 10/08* (2013.01); *F25D 2600/06* (2013.01)
(58) Field of Classification Search
  CPC .... F25D 2317/04; F25D 16/00; F25D 17/045; F25D 2700/00; F25D 27/005; F25D 2600/06; F25B 2400/13; F25B 2600/07; B60H 1/00657; B65D 88/745; G06Q 10/08
  See application file for complete search history.

(56) References Cited

U.S. PATENT DOCUMENTS

| | | | |
|---|---|---|---|
| 5,333,394 A | 8/1994 | Herdeman et al. | |
| 6,134,667 A | 10/2000 | Suzuki et al. | |
| 6,529,133 B2 | 3/2003 | Tamaoki et al. | |
| 6,644,056 B2 * | 11/2003 | Goth | H05K 7/20381 62/126 |
| 7,047,753 B2 | 5/2006 | Street et al. | |
| 8,374,824 B2 | 2/2013 | Schwiers et al. | |
| 3,390,464 A1 | 3/2013 | Slifkin et al. | |
| 8,390,464 B1 * | 3/2013 | Slifkin | G06Q 10/08 340/585 |
| 8,960,563 B1 | 2/2015 | Perten et al. | |
| 9,569,376 B1 * | 2/2017 | Batchelor | G06F 13/102 |
| 9,846,086 B1 * | 12/2017 | Robinson | G01K 3/04 |
| 11,279,559 B1 * | 3/2022 | Montgomery | B65G 1/137 |
| 2007/0214258 A1 * | 9/2007 | Karrapanan | H04L 67/18 709/224 |
| 2013/0271290 A1 | 10/2013 | Saenz et al. | |
| 2013/0298575 A1 * | 11/2013 | Stark | B65D 88/74 62/125 |
| 2014/0180953 A1 * | 6/2014 | Westcott | G06Q 10/0832 705/332 |
| 2014/0343741 A1 | 11/2014 | Clarke | |
| 2015/0338154 A1 * | 11/2015 | Senf | F25B 5/02 62/196.1 |
| 2016/0216028 A1 * | 7/2016 | Jónsson | F25D 29/008 |
| 2018/0347895 A1 * | 12/2018 | Jonsson | F25D 29/003 |
| 2019/0047356 A1 * | 2/2019 | Ferguson | G05D 1/0061 |

FOREIGN PATENT DOCUMENTS

| | | |
|---|---|---|
| WO | 2013178227 A1 | 12/2013 |
| WO | 2015028072 A1 | 3/2015 |
| WO | 2016139364 A1 | 9/2016 |

OTHER PUBLICATIONS

ISR/WO, Issued Jan. 17, 2018, PCT Application No. PCT/US2017/056316, 13 pages.
Retrieved on Aug. 22, 2016 <https://www.containerhandbuch.de/chb_e/stra/stra_03_01_01_02.html>, 9 pages.
Retrieved on Aug. 22, 2016, <http://www2.orbcomm.com/reefertrak>, 3 pages.

* cited by examiner

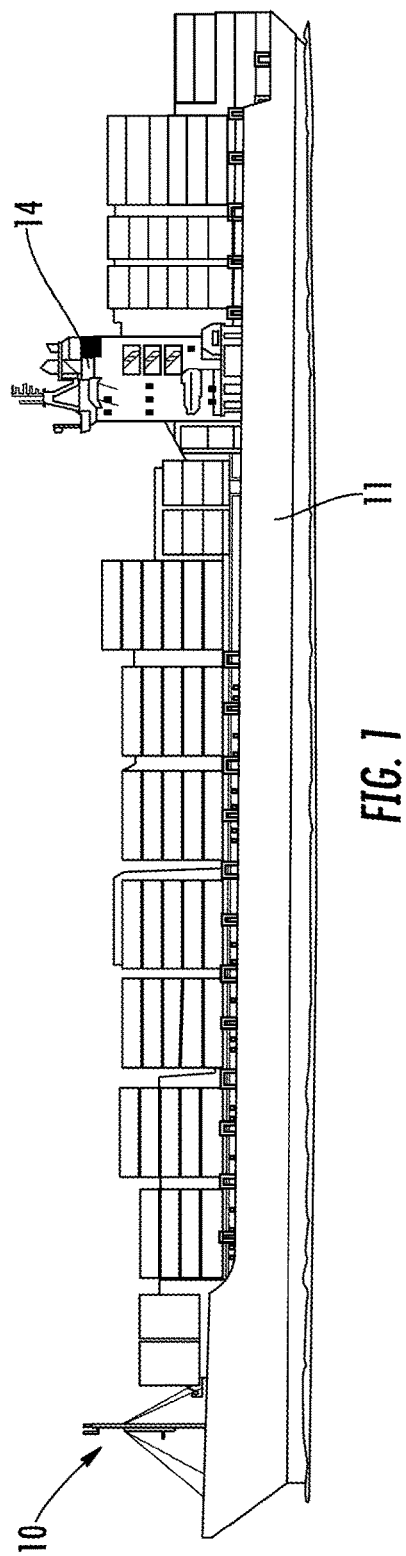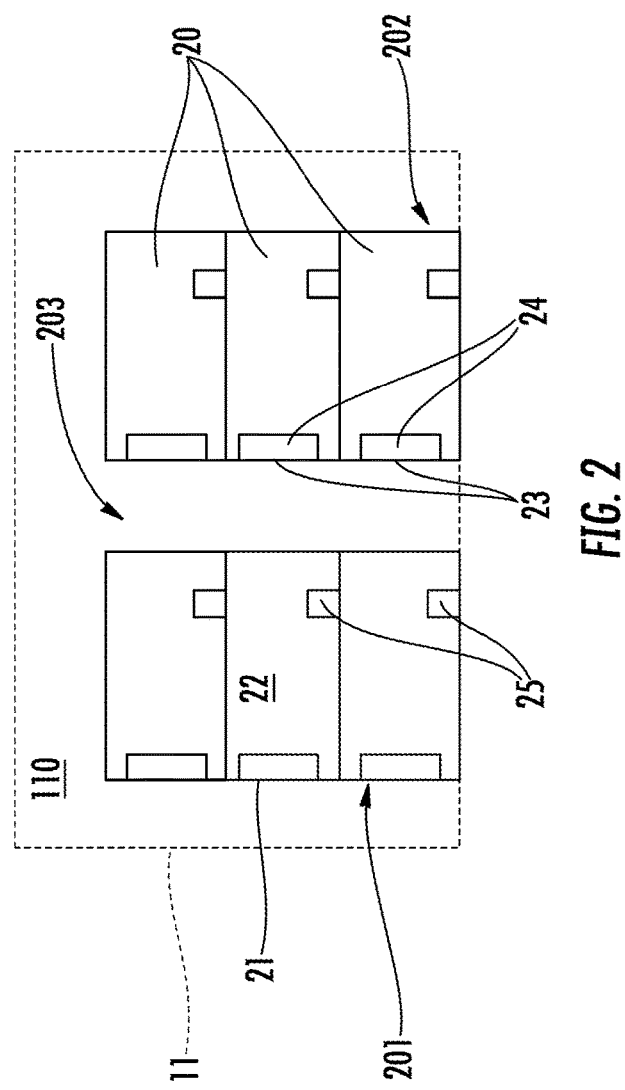

COORDINATION OF REFRIGERATED STORAGE CONTAINERS

BACKGROUND OF THE DISCLOSURE

The subject matter disclosed herein relates to refrigerated storage containers and, more particularly, to refrigerated storage container air passage designs, energy efficient refrigerated storage container operation and energy efficient coordination of refrigerated storage containers on naval ships.

A refrigerated storage container or reefer is an intermodal container (i.e., a shipping container) that is used in intermodal freight transport and may be refrigerated for the transportation of temperature sensitive cargo. An intermodal container is a large standardized shipping container, designed and built for intermodal freight transport, meaning these containers can be used across different modes of transport—from ship to rail to truck—without unloading and reloading their cargo. Intermodal containers are primarily used to store and transport materials and products efficiently and securely in the global containerized intermodal freight transport system, but smaller numbers are in regional use as well.

Other than the standard, general purpose containers, many variations of intermodal containers exist for use with different types of cargoes. The most prominent of these are refrigerated containers, such as containers with integrated refrigeration units (a.k.a. reefers) that are used in the transport of temperature sensitive goods.

BRIEF DESCRIPTION OF THE DISCLOSURE

According to one aspect of the disclosure, a system is provided and includes refrigerated storage containers, local controllers respectively coupled with corresponding refrigerated storage containers to control operations thereof in accordance with controller parameters and a supervisory controller. The supervisory controller is configured to issue control commands to the local controllers based on respective responses of the refrigerated storage containers to local controller control.

In accordance with additional or alternative embodiments, the local controllers are configured to override the control of the supervisory controller.

In accordance with additional or alternative embodiments, the supervisory controller is coupled with each local controller to receive first data reflective of the controller parameters and with each refrigerated storage container to receive second data reflective of respective responses of the refrigerated storage containers to the local controller control.

In accordance with additional or alternative embodiments, the supervisory controller issues control commands to each local controller, the control commands including supervisory controller output and an optimal on/off command schedule.

In accordance with additional or alternative embodiments, the first data includes condenser air inlet temperature measurements of at least one refrigerated container and operational parameters of at least one refrigerated container. The operational parameters include refrigerated container on/off mode information, desired set point information, allowable temperature variability information and ambient temperature information. The second data includes at least one or more of refrigerated container cargo space controlled temperature information and electrical power draw information.

In accordance with one or more additional or alternative embodiments, the supervisory controller is configured to issue the control commands to the local controllers based on the respective responses of the refrigerated storage containers to local controller control and at least one or more of a learned time constant of one of the refrigerated storage containers, a time constant associated with an interaction of a group of the refrigerated storage containers and knowledge of expected environmental conditions.

In accordance with additional or alternative embodiments, each refrigerated storage container includes a cargo space temperature sensor.

In accordance with additional or alternative embodiments, the supervisory controller is configured to determine a correlation between electric power consumption of each refrigerated storage container and the local controller control and determine an optimal on-off control strategy based on the correlation that satisfies cargo space temperature requirements and minimizes power consumption and short cycling.

In accordance with additional or alternative embodiments, the supervisory controller is provided as a plurality of supervisory controllers respectively associated with portions of the local controllers and corresponding refrigerated storage containers.

According to another aspect of the disclosure, a supervisory controller of a ship or a yard on which refrigerated storage containers are provided is provided. The supervisory controller includes an input unit disposed to receive first data from at least one local controller of the refrigerated storage containers and second data from at least one sensor of the refrigerated storage containers, an output unit disposed to issue control commands to at least one local controller and a processing unit configured to generate the control commands based on an optimized control strategy derived from a correlation between the first and second data.

In accordance with additional or alternative embodiments, the optimized control strategy satisfies cargo space temperature requirements and minimizes power consumption and short cycling.

In accordance with additional or alternative embodiments, the first data includes condenser air inlet temperature measurements of at least one refrigerated container and operational parameters of at least one refrigerated container. The operational parameters include refrigerated container on/off mode information, desired set point information, allowable temperature variability information and ambient temperature information. The second data includes at least one or more of refrigerated container cargo space controlled temperature information and electrical power draw information.

In accordance with additional or alternative embodiments, the processing unit is configured to generate the control commands based on the optimized control strategy derived from the correlation between the first and second data and at least one or more of a learned time constant of one of the refrigerated storage containers, a time constant associated with an interaction of a group of the refrigerated storage containers and knowledge of expected environmental conditions.

In accordance with additional or alternative embodiments, the processing unit is configured to determine a correlation between electric power consumption of each of the refrigerated storage containers and local controller control and determine an optimal on-off control strategy based on the correlation that satisfies the cargo space temperature requirements and minimizes the power consumption and the short cycling.

In accordance with additional or alternative embodiments, the supervisory controller is provided as a plurality of supervisory controllers respectively associated with clustered local controllers.

According to yet another aspect of the disclosure, a method of operating refrigerated storage containers provided on a ship or in a yard is provided. The method includes receiving first data from local controllers of the refrigerated storage containers, receiving second data from sensors of the refrigerated storage containers, identifying a correlation between the electric power consumption of the refrigerated storage containers and operations of the refrigerated storage containers from the first and second data and determining an optimal on-off control strategy for each refrigerated storage container based on the correlation that satisfies cargo space temperature requirements and minimizes power consumption and short cycling.

In accordance with additional or alternative embodiments, the first data includes condenser air inlet temperature measurements of at least one refrigerated container and operational parameters of at least one refrigerated container. The operational parameters include refrigerated container on/off mode information, desired set point information, allowable temperature variability information and ambient temperature information. The second data includes at least one or more of refrigerated container cargo space controlled temperature information and electrical power draw information.

In accordance with additional or alternative embodiments, the determining is further based on at least one or more of a learned time constant of one of the refrigerated storage containers, a time constant associated with an interaction of a group of the refrigerated storage containers and knowledge of expected environmental conditions.

In accordance with additional or alternative embodiments, the method further includes issuing control commands based on the optimal on-off control strategy for each refrigerated storage container to the local controllers.

In accordance with additional or alternative embodiments, wherein the determining further includes determining a correlation between electric power consumption of each of the refrigerated storage containers and local controller control.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 1 is a perspective view of a ship in accordance with embodiments;

FIG. 2 is a perspective view of stacks of refrigerated storage containers within a ship in accordance with embodiments;

Figure 3:
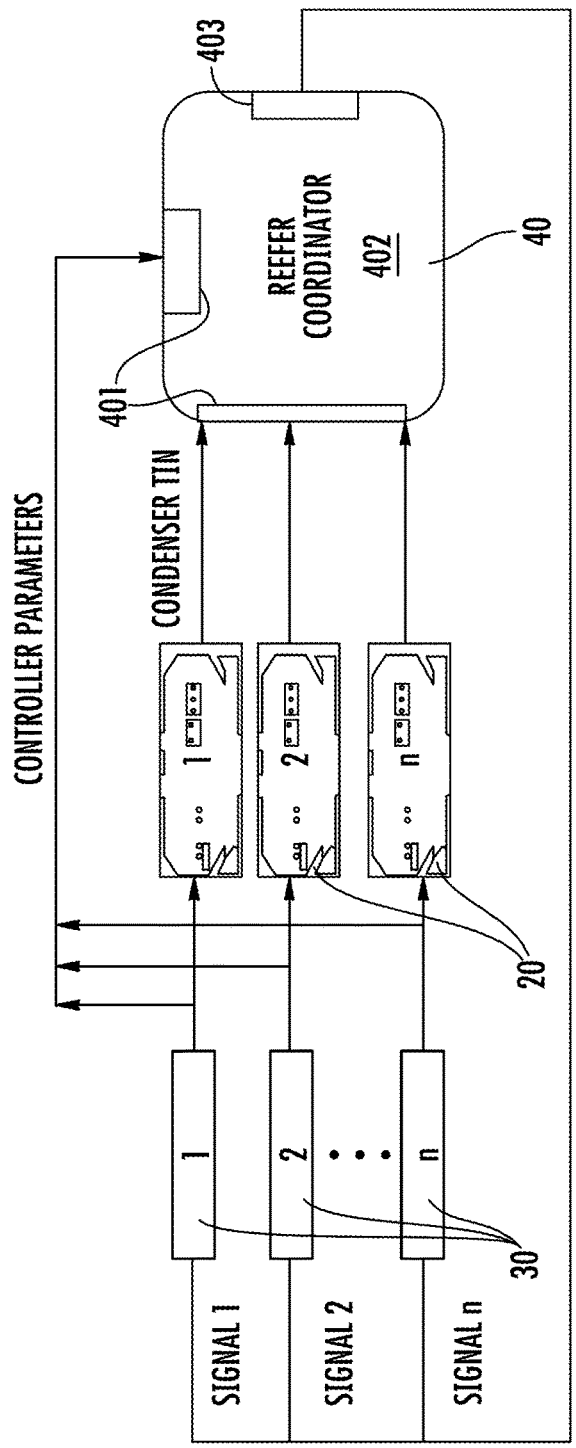
FIG. 3 is a schematic diagram illustrating local controllers and a supervisory controller for refrigerated storage containers in accordance with embodiments.

The detailed description explains embodiments of the disclosure, together with advantages and features, by way of example with reference to the drawings.

DETAILED DESCRIPTION OF THE DISCLOSURE

As will be described below, containers with refrigeration systems which are generally referred to as reefers, need to dissipate heat through condensers. Air-cooled reefers employ fans to extract ambient air from the reefer's surroundings, pass the extracted air through condensers and then discharge the resulting heated air back into the ambient air of the surroundings. On a container ship or in a container yard, reefers are stacked in rows separated by a narrow aisle, however, and therefore air exhaust from a condenser may impinge on containers across the aisle. Such impingement can lead to the heating of reefers across the aisle, increased condensing pressure and hence power consumption with elevated air temperatures with condenser air recirculation due to reflection and potential cargo degradation caused by system trip-offs with continuous increasing air temperature into condenser due to recirculated air.

As such, air openings are typically designed into reefers in order to alleviate the effects of recirculated heated air (condenser air recirculation due to reflection can also be reduced or avoided by increasing the distance between aisles, but space constraints on a ship or in a yard are frequently stringent). Such air openings can be more effective, however, with the addition of louvers with adjustable parallel blades that can direct air at an angle to reduce direct impingement and hence decrease air reflection. The blades can be set at an angle between 30-60 degrees relative to the horizontal so that air will be exhausted upward with buoyance or so that cool exhaust air from inside the reefer will be directed toward the condenser air inlets.

With reference to FIG. 1, a transport ship 10 is provided. The transport ship 10 can be configured for any type of transportation mode but for purposes of clarity and brevity will be referred to hereinafter as a transport ship 10. The transport ship 10 includes a hull 11, a propeller (not shown) to drive the hull 11 through water, an engine room (not shown) that is disposed within the hull 11 to drive rotations of the propeller and a bridge or command center 14. The command center 14 is disposed within or on the hull 11 and includes a bridge and operational computers that control various operations of the transport ship 10.

With reference to FIG. 2, the hull 11 is formed to define an interior 110 in which reefers or refrigerated storage containers 20 are stowed (the terms "reefer" and "refrigerated storage container" will hereinafter be used interchangeably). The refrigerated storage containers 20 may be provided in at least first and second stacks 201 and 202 that are separated by an aisle 203. The aisle 203 is generally wide enough for a person to walk between the first and second stacks 201 and 202 and is provided at the ambient temperature of the interior 110. Each of the first and second stacks 201 and 202 may have one or more refrigerated storage containers 20 stacked top-to-bottom.

For the purposes of the present description, each refrigerated storage container 20 may have a substantially uniform structure and configuration. That is, each refrigerated storage container 20 may be provided as a substantially rectangular body 21 that is formed to define an interior 22 in which cargo is stored. The body 21 includes a bottom, sidewalls and a top that are provided to enclose the interior 22 and the sidewalls include an endwall 23 that faces the aisle 203. Each refrigerated storage container 20 may further include a condenser 24 of an air conditioning unit which is disposed within the interior 22 to condition the air in the interior 22 and sensors 25 (e.g., cargo space temperature sensors) to sense various operational parameters of the refrigerated storage container 20.

Various operations of the refrigerated storage containers 20 are controllable by one or more local controllers 30 and one or more supervisory controllers 40. The one or more local controllers 30 and the one or more supervisory controllers 40 may be stand-alone components or components of the above-mentioned operational computers.

Figure 4:
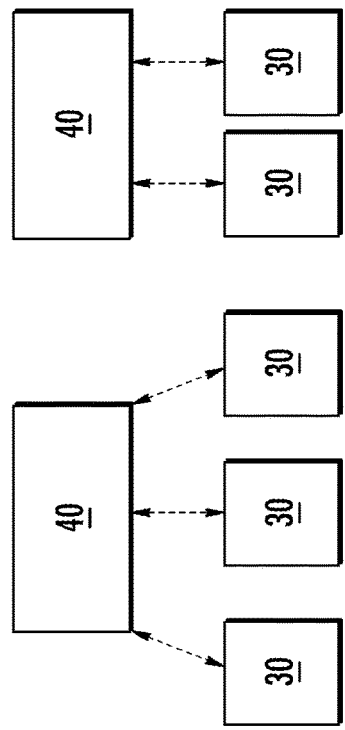
FIG. 4 is a schematic diagram illustrating local controllers and two or more supervisory controllers for refrigerated storage containers in accordance with embodiments.

In accordance with embodiments and, as shown in FIGS. 3 and 4, each local controller 30 may be associated and coupled with a corresponding one of the refrigerated storage containers 20. In some cases, a single distributed supervisory controller 40 may be associated and coupled with each of the local controllers 30 or multiple local controllers 30 and their corresponding refrigerated storage containers 20 (see FIG. 3) whereas, in other cases, two or more supervisory controllers 40 may be associated and coupled with respective groups or clusters of local controllers 30 and each of their corresponding refrigerated storage containers 20. In any case, each local controller 30 controls various operations of its corresponding refrigerated storage container 20 in accordance with controller parameters while the readings generated by the sensors 25 are provided to either or both of the supervisory controller 40 and the local controller 30 such that the controls exerted by the local controller 30 can be optimized via local and/or remote feedback control.

Figure 6:
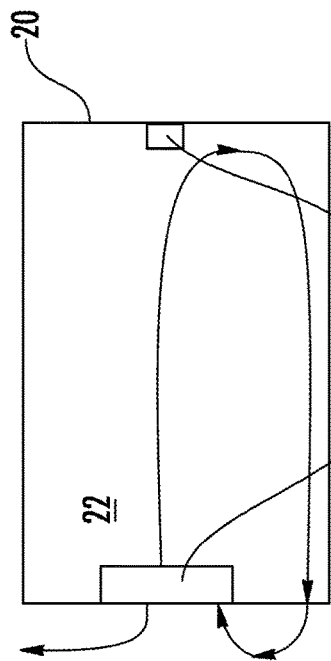
FIG. 6 is a cut-away, side view of a refrigerated storage container in accordance with embodiments.
Figure 5:
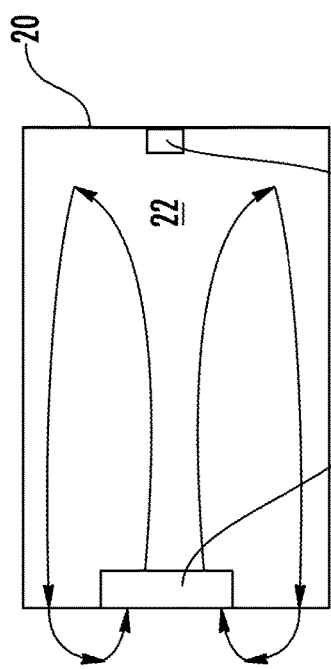
FIG. 5 is a cut-away, top-down view of a refrigerated storage container in accordance with embodiments.
Figure 7:
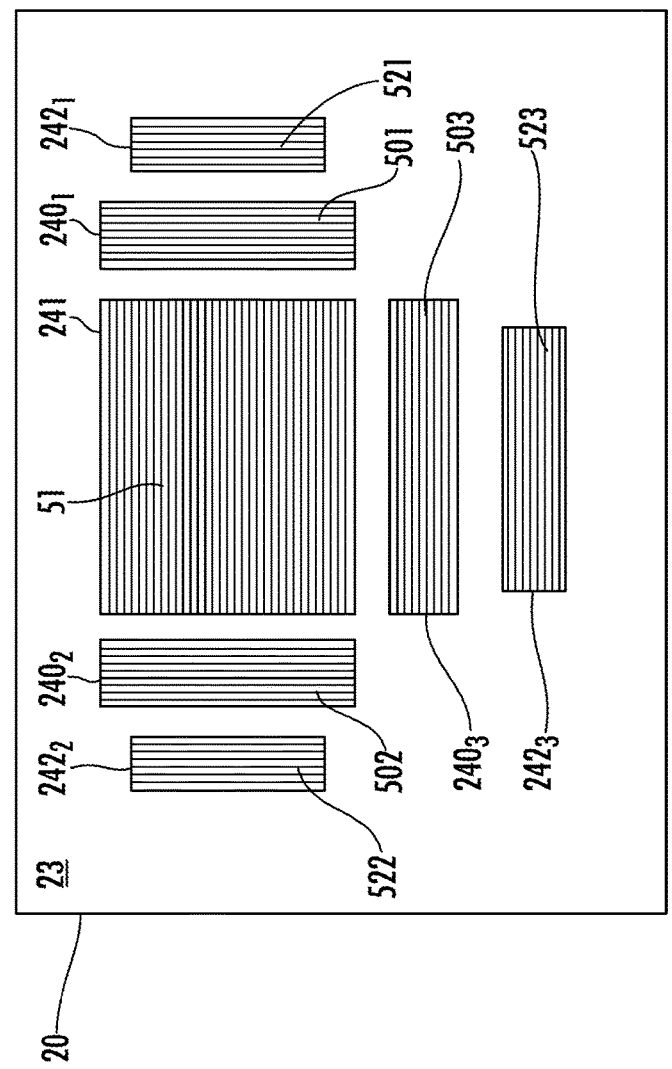
FIG. 7 is an end view of an end wall of the refrigerated storage container of FIGS. 5 and 6 in accordance with embodiments.

With reference to FIGS. 5-7, the condenser 24 is disposed within the interior 22 and at an end of the refrigerated storage container 20 near the end wall 23 and is configured to remove heat from a refrigerant passing through the condenser 24. The end wall 23 is formed to support the operations of the condenser 24. That is, first, second and third condenser air inlets $240_{1-3}$, a condenser air outlet 241 and first, second and third reefer air outlets $242_{1-3}$ are supportively disposed on the end wall 23. The first, second and third condenser air inlets $240_{1-3}$ are receptive of the air to remove heat from a refrigerant passing through the condenser 24 and thus should be receptive of relatively cool air for encouraging optimal, efficient operation of the condenser 24. The condenser air outlet 241 is configured to direct the relatively high temperature air exhausted from the condenser 24 away from the first, second and third condenser air inlets $240_{1-3}$ such that the relatively high temperature air is not received or ingested by the first, second and third condenser air inlets $240_{1-3}$. The first, second and third reefer air outlets $242_{1-3}$ are configured to direct the conditioned air and relatively low temperature air that is exhausted from the interior 22 toward the first, second and third condenser air inlets $240_{1-3}$. This relatively low temperature air then mixes with ambient air provided within the region in and around the aisle 203 before being received or ingested by the first, second and third condenser air inlets $240_{1-3}$.

In accordance with embodiments, the condenser air outlet 241 may be located in a central, somewhat upper region of the end wall 23. In such cases, the first and second condenser air inlets $240_1$ and $240_2$ may be located proximate to opposite sides of the condenser air outlet 241 with the third condenser air inlet $240_3$ located just below the condenser air outlet 241. The condenser air outlet 241 may therefore be configured to direct the relatively high temperature air in an upward direction so as to avoid generating flows of air toward and over the first, second and third condenser air inlets $240_{1-3}$. In addition, the first and second reefer air outlets $242_1$ and $242_2$ may be located proximate to and outside of the first and second condenser air inlets $240_1$ and $240_2$, respectively, with the third reefer air outlet $242_3$ located just below the third condenser air inlet $240_3$.

Each one of the first, second and third condenser air inlets $240_{1-3}$ includes CAI louvers 501, 502 and 503, the condenser air outlet 241 includes CAO louvers 51 and each one of the first, second and third reefer air outlets $242_{1-3}$ includes RAO louvers 521, 522 and 523. The CAI louvers 501, 502 and 503, the CAO louvers 51 and the RAO louvers 521, 522 and 523 may all be independently or dependently controlled by the local controllers 30 and/or the supervisory controllers 40. Such independent or dependent controls generally relates to angling of respective louver blades and in some cases to positioning of the angled louver blades relative to the end wall 23.

In accordance with embodiments and, as shown in FIG. 7, the blades of the CAI louvers 501 and 502 are oriented substantially vertically and in parallel with each other. During operational modes of the refrigerated storage container 20, the blades of the CAI louvers 501 and 502 may be angled outwardly (at approximately 30-60 degrees, for example) toward the first and second reefer air outlets $242_1$ and $242_2$, respectively. Similarly, the blades of the CAI louver 503 are oriented substantially horizontally and in parallel with each other. During operational modes of the refrigerated storage container 20, the blades of the CAI louver 503 may be angled downwardly (at approximately 30-60 degrees, for example) toward the third reefer air outlet $242_3$. The blades of the RAO louvers 521 and 522 are oriented substantially vertically and in parallel with each other. During operational modes of the refrigerated storage container 20, the blades of the RAO louvers 521 and 522 may be angled inwardly (at approximately 30-60 degrees, for example) toward the first and second condenser air inlets $240_1$ and $240_2$, respectively. Similarly, the blades of the RAO louver 523 are oriented substantially horizontally and in parallel with each other. During operational modes of the refrigerated storage container 20, the blades of the RAO louver 523 may be angled upwardly (at approximately 60 degrees, for example) toward the third condenser air inlet $240_3$. The blades of the CAO louver 51 are oriented substantially horizontally and in parallel with each other. During operational modes of the refrigerated storage container 20, the blades of the CAO louvers 51 may be angled upwardly (at approximately 60 degrees, for example) away from the first, second and third condenser air inlets $240_1$, $240_2$ and $240_3$.

Figure 8:
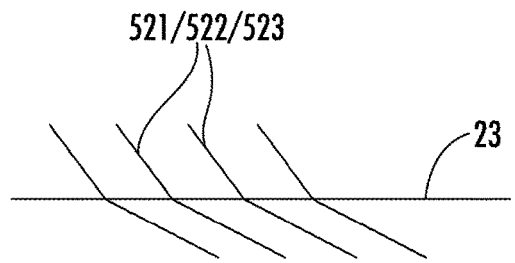
FIG. 8 is a top-down view of movable louvers in accordance with embodiments.

With reference to FIG. 8, at least the blades of the RAO louvers 521, 522 and 523 may be independently or dependently movable by the local controllers 30 and/or the supervisory controllers 40 relative to a plane of the end wall 23. That is, as shown in FIG. 8, during operational modes of the refrigerated storage container 20, at least the blades of the RAO louvers 521, 522 and 523 may be extended such that they protrude from the plane of the end wall 23 and thereby increase flows of air exhausted from the interior 22 into the first, second and third condenser air inlets $240_{1-3}$.

Figure 9:
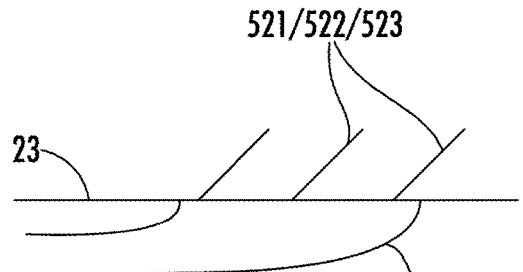
FIG. 9 is a top down view of an attachment to an end wall of a refrigerated storage container in accordance with embodiments.

With reference to FIG. 9, at least the first, second and third reefer air outlets $242_{1-3}$ may be provided with an attachment 60. The attachment 60 is removably attachable to the end wall 23 by, for example, press-fitting or other similar attachment methods (i.e., by an operator walking down the aisle 203), and is shaped to direct air exhausted from the interior 22 toward the condenser air inlets $240_{1-3}$. The attachment 60 has an open end that terminates short of the first, second and third condenser air inlets $240_{1-3}$ so as to avoid interfering with flows of ambient air into the condenser 24 and to encourage air exiting the attachment 60 to be entrained to flow into the condenser 24 by other flows of ambient air.

In accordance with further embodiments, to the extent any of the blades of the RAO louvers 521, 522 or 523 protrude from the plane of the end wall 23 or to the extent that an attachment 60 is removably attached to the first, second and third reefer air outlets $242_{1-3}$, it is to be understood that the length of the protrusion or the width of the attachment 60 is substantially less than the width of the aisle 203. For example, if the aisle 203 is about 2 meters wide, the length of the protrusion or the width of the attachment 60 is on the order of only a few centimeters.

The above-described louvers will help reduce recirculation of heated air and direct impingement of heated air into and onto refrigerated storage containers 20 and will thereby improve energy efficiency and operation of the refrigerated storage containers 20. For refrigerated storage containers 20 with ventilation or air modification capabilities, cold air that is discharged from interiors 22 can be utilized to lower condenser air temperatures and therefore reduce energy consumption of the refrigeration system and improve operation to maintain cargo quality.

In accordance with another aspect and, with reference back to FIGS. 2-4, when refrigerated storage containers 20 are stacked close to each other within an interior 110, some of the exhaust hot air from one refrigerated storage container 20 may enter the condensers of nearby refrigerated storage containers 20 even if the above-described louvers are provided. Such re-ingestion of hot air can lead to elevated air temperatures entering condensers 24 and result in increased condensing pressure of refrigerant as well as increased power usage to maintain refrigerant flow in the vapor compression system. Re-ingestion can also lead to cooling systems being tripped off when refrigerant condensing pressures exceed control limits with a potential result of degraded cargo quality.

Scheduling reefer operations to avoid re-ingestion of hot air typically relies on local feedback control where the refrigeration unit including the condenser 24 of each refrigerated storage container 20 is cycled on and off based primarily on the cargo temperature requirements of each particular refrigerated storage container 20 and without any information on the operation of adjacent refrigerated storage containers 20 and their exhaust air flow distributions. A decentralized control algorithm is provided, however, with low sensing and communication requirements in which each local controller 30 determines when to turn its corresponding refrigerated storage container 20 on and off within a given time window in order to minimize waste heat ingestion from neighboring refrigerated storage containers 20.

Using the control algorithm, ambient air temperature and condenser inlet air temperature are measured and the difference between them ($\Delta$T) is utilized as a pseudo-data element for potential exhaust air ingestion. The algorithm further includes on-off control logic that minimizes interactions between adjacent refrigerated storage containers 20 and enables higher system operation efficiency by running the refrigerated storage containers when $\Delta$T is sufficiently small. The time window for the on-off decision making depends on cargo space temperature performance information and allowable temperature variability (Thigh, Tlow) around given set-point (Tsp).

Figure 10:
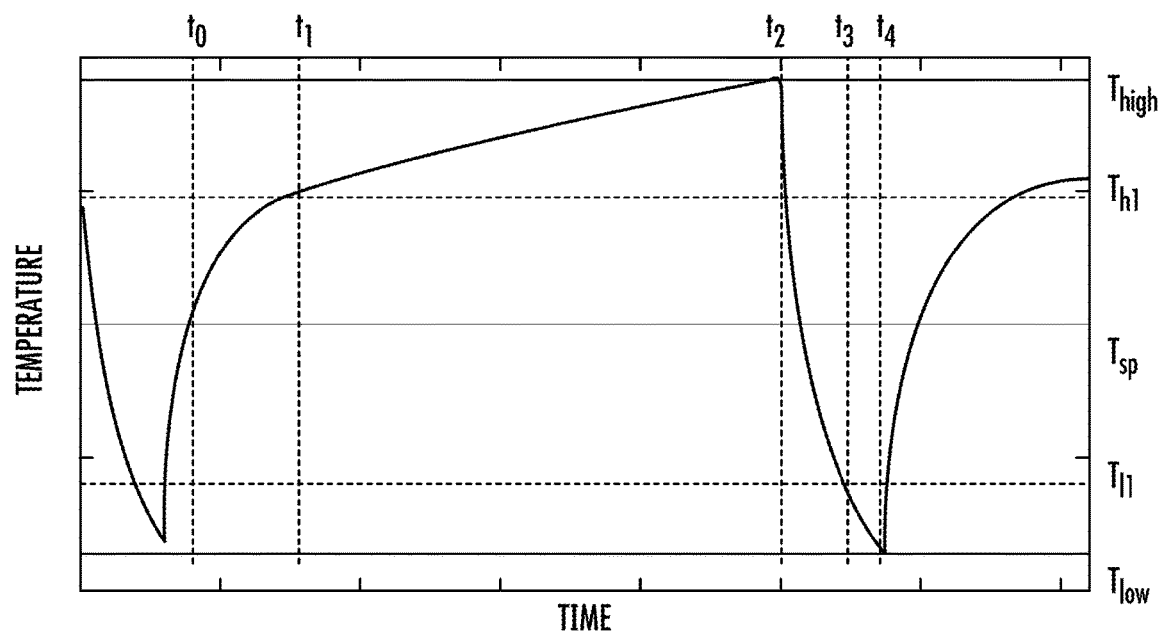
FIG. 10 is a graphical illustration of temperature vs. time performance of a refrigerated storage container.

In greater detail and, with reference to FIG. 10, each refrigerated storage container 20 includes its local controller 30 and the local controller 30 is configured to cycle the corresponding condenser 24 of its air conditioner on an off within a time window based on waste heat ingestion from the neighboring refrigerated storage containers 20. The time window is predefined in accordance with temperatures within the interior 22 and allowable temperature variability around a set-point Tsp. This allowable temperature variability gives rise to high and low temperature limits ($T_{high}$ and $T_{low}$) as well as high and low temperature near-limits ($T_{h1}$ and $T_{l1}$).

The local controller 30 derives a value of the waste heat ingestion from a difference between periodically measured ambient and condenser inlet air temperatures and is configured to limit a number of cycles within the time window, implement an override command to force the air conditioner to cycle in an event a temperature within the interior reaches a limit and potentially override a cycling command issued by a supervisory controller (generally, if a supervisory controller is present, it is to be understood that a default condition could be that the supervisory controller would have priority to override local level decisions except in critical situations or for safety reasons).

Thus, for the example of FIG. 10, as a temperature of the interior 22 of a given refrigerated storage container 20 increases beyond high temperature near-limit $T_{h1}$, which is passed at time $t_1$, until the high temperature limit $T_{high}$ is reached at time $t_2$, the local controller 30 will determine if the difference between the ambient air temperature and the condenser inlet air temperature is less than a predefined threshold. If so, the local controller 30 will cycle the condenser 24 and the air conditioning unit to turn on and, if not, the local controller 30 will maintain the condenser 24 and the air conditioning unit in the off state until time $t_2$ when the high temperature limit ($T_{high}$) is reached, and must then turn on the air conditioning unit and the condenser 24. Conversely, as the temperature of the interior 22 decreases beyond low temperature near-limit $T_{l1}$, which is passed at time $t_3$, until the low temperature limit $T_{low}$ is reached at time $t_4$, the local controller 30 will determine if the difference between the ambient air temperature and the condenser inlet air temperature exceeds a predefined threshold. If so, the local controller 30 will cycle the condenser 24 and the air conditioning unit to turn off and, if not, the local controller 30 will maintain the condenser 24 and the air conditioning unit in the on state until time $t_4$.

Figure 11:
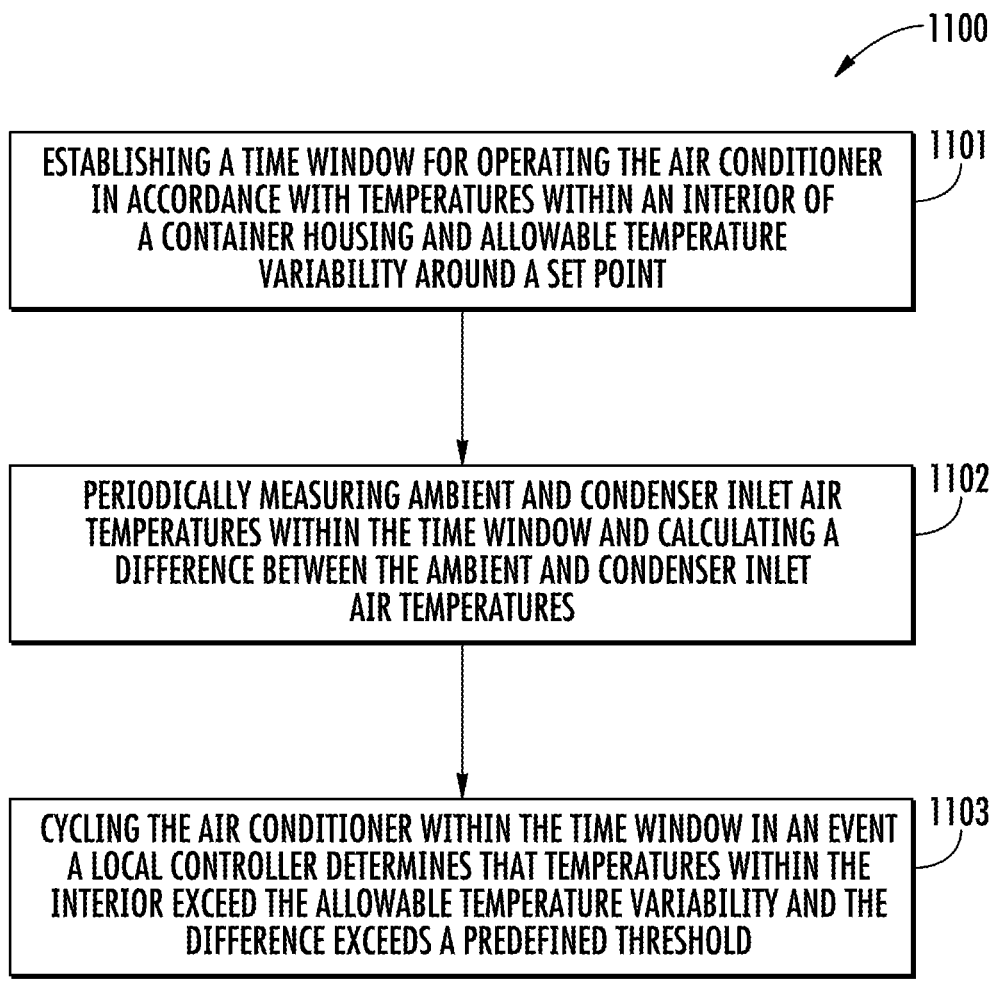
FIG. 11 is a flow diagram illustrating a method of executing energy-efficient operations of an air conditioner of a refrigerated storage container.

With reference to FIG. 11, a method of executing energy-efficient operations of an air conditioner of each of the refrigerated storage containers 20 is provided. The method includes establishing a time window for operating the air conditioner in accordance with temperatures within an interior of a container housing and allowable temperature variability around a set-point (block 1101), periodically measuring ambient and condenser inlet air temperatures within the time window and calculating a difference between the ambient and condenser inlet air temperatures (block 1102) and cycling the air conditioner within the time window in an event a local controller determines that temperatures within the interior exceed the allowable temperature near limits variability and the difference exceeds a predefined threshold (block 1103).

The autonomous reefer schedule logic based on the quality of air at the unit's condenser inlet, in addition to the cargo space temperature, minimizes potential waste heat ingestion and thereby reduces energy usage for refrigeration. The decentralized control logic only requires one additional sensor for condenser inlet temperature, rendering the solution practical with low implementation cost. The control logic can be easily integrated with the individual unit legacy controller or implemented as a stand-alone local controller for each reefer.

In accordance with still further aspects, overall electrical energy consumption related to operations of the refrigerated storage containers 20 is controlled through coordination of multiple refrigerated storage containers 20 and the local controllers 30 by the supervisory controller 40. The supervisory controller 40 (e.g., the reefer coordinator) receives condenser inlet temperate measurements and operational parameters from the local controllers 30 and uses the data to learn or identify (online) correlations between the total electric power consumption of each of the refrigerated storage containers 20 and their respective operations and thus determines an optimal on-off control strategy that satisfies cargo space temperature requirements and minimizes power consumption and short cycling.

As shown in FIG. 3, operational data transmitted to an input unit 401 of the supervisory coordinator 40 is transmitted at sampling instants and includes individual unit on/off mode information, cargo space controlled temperature information, desired set-point information, allowable temperature variability information, electrical power draw information and ambient air temperature information. Output of the supervisory controller 40 and on/off commands are generated by processing unit 402 and may be sent from an output unit 403 to the various local controllers 30. The supervisory controller 40 architecture could be distributed or centralized. That is, as noted above, in the distributed framework, a supervisory coordinator 40 is assigned to a cluster of refrigerated storage containers 20 and the predictive model is localized to a given neighborhood whereas, in a centralized strategy, a single supervisory coordinator monitors and schedules all the on-board refrigerated storage containers 20.

Figure 12:
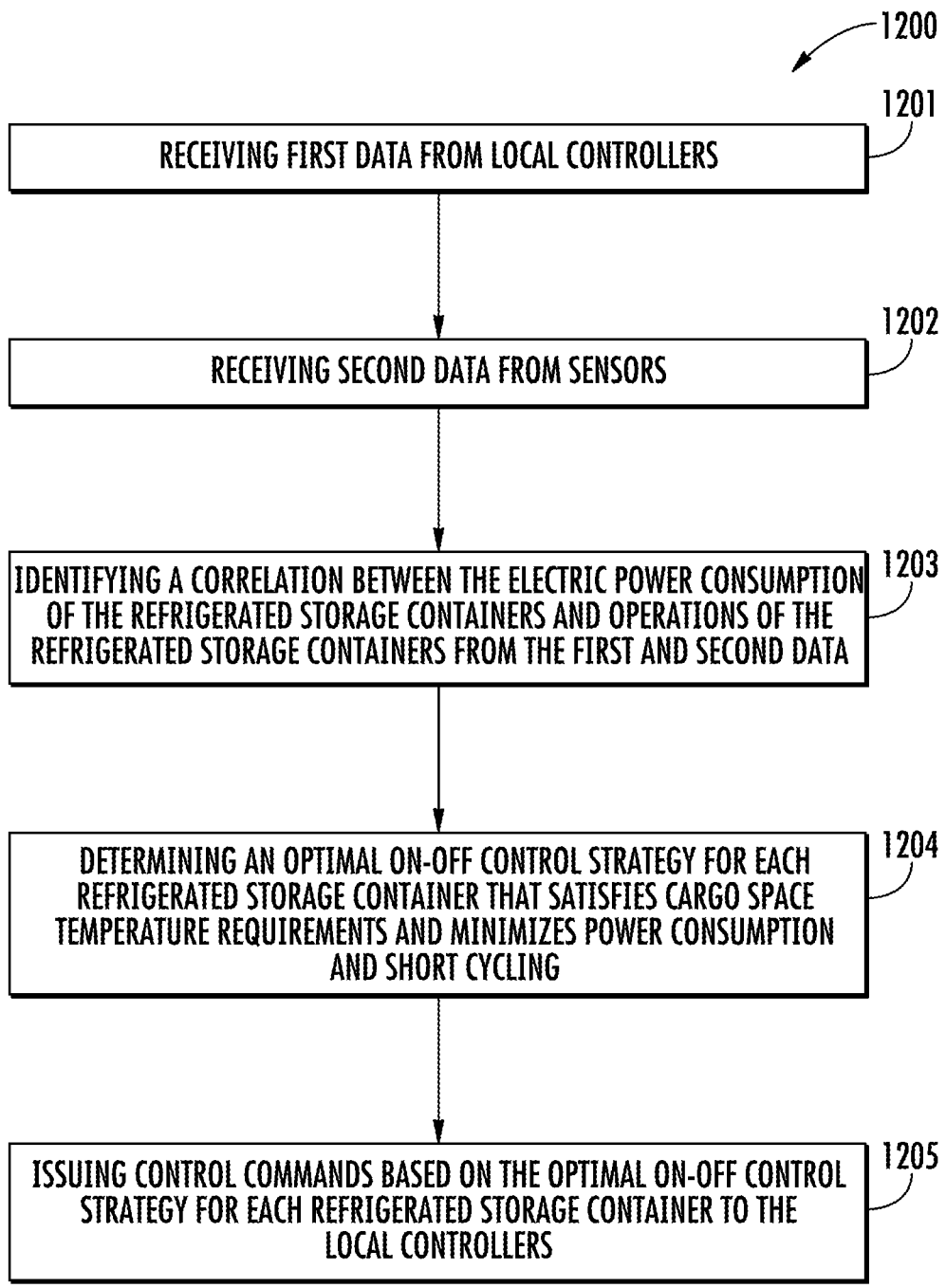
FIG. 12 is a flow diagram illustrating a method of operating refrigerated storage containers provided on a ship or in a yard.

With reference to FIG. 12, a method of operating refrigerated storage containers 20 provided on a ship or in a yard is provided. The method includes receiving first data (i.e., condenser air inlet temperate measurements and operational parameters, such as on/off mode information, desired set point information, allowable temperature variability information and ambient temperature information) from local controllers of the refrigerated storage containers (block 1201), receiving second data (i.e., cargo space controlled temperature information, and electrical power draw information) from sensors of the refrigerated storage containers (block 1202), identifying a correlation between the electric power consumption of the refrigerated storage containers and operations of the refrigerated storage containers from the first and second data (block 1203) and determining an optimal on-off control strategy for each refrigerated storage container based on the correlation that satisfies cargo space temperature requirements and minimizes power consumption and short cycling (block 1204).

In accordance with embodiments, the determining may be further based on at least one or more of a learned time constant of one or more of the refrigerated storage containers, a time constant associated with an interaction of a group of the refrigerated storage containers and knowledge of expected environmental conditions. That is, if over time one of the refrigerated storage containers 20 (or a group of refrigerated storage containers 20) is/are found to respond more quickly to controls executed by its/their local controller 30 while another refrigerated storage container 20 responds slowly, the supervisory controller 40 can derive a learned time constant for each refrigerated storage container 20. This learned time constant can thereafter be updated periodically and used in concert with knowledge of future or expected environmental conditions (e.g., weather, on-board and off-board temperatures, transport time, etc.) to modulate the determining of the on-off control strategy.

The method further includes issuing control commands based on the optimal on-off control strategy for each refrigerated storage container to the local controllers (block 1205). These control commands can be overridden in some cases by the local controllers 30 if they are in conflict with control algorithms resident in the local controllers 30 individually. For example, if the control algorithm of the embodiments of FIGS. 10 and 11 dictate that a local controller 30 should cycle a condenser 24 on at time $t_2$ when the $T_{high}$ limit of FIG. 10 is reached but the control algorithm of the supervisory controller 40 dictates the opposite, the local controller 30 will override the commands of the supervisory controller 40.

When additional data related to, for example, diesel generator(s) and fuel efficiencies are available, the supervisory controller 40 may also optimize generator fuel consumption while guaranteeing cargo reliability based on a holistic view of on-board electrical systems. Such energy aware scheduling systems may achieve fuel savings by reducing generator(s) operation at inefficient part-load conditions, generator (and reefer) cycling rates and hot air re-ingestion.

The supervisory controller 40 serves to minimize total electrical energy usage while maintaining cargo space temperatures within acceptable ranges by coordination of multiple refrigerated storage containers 20 to prevent unwanted waste heat re-ingestion. Also, the solution guarantees dynamic optimal performance by learning system behaviors online and adapting to operational and ambient changes.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A system, comprising:
   refrigerated storage containers;

local controllers respectively coupled with corresponding refrigerated storage containers to control operations thereof in accordance with controller parameters; and a supervisory controller configured to issue control commands to the local controllers based on respective responses of the refrigerated storage containers to local controller control, wherein:

the supervisory controller is coupled with each of the local controllers to receive first data reflective of the controller parameters and with each of the refrigerated storage containers to receive second data reflective of respective responses of each of the refrigerated storage containers to the local controller control, the first data comprises condenser air inlet temperature measurements of at least one refrigerated container and operational parameters of at least one refrigerated container, the operational parameters comprise refrigerated container on/off mode information, desired set point information, allowable temperature variability information and ambient temperature information, the second data comprises refrigerated container cargo space controlled temperature information and electrical power draw information, and the local controllers are configured to override the control commands of the supervisory controller, and wherein the local controllers are configured to override the control of the supervisory controller in an event the control commands conflict with control algorithms resident in the local controllers individually.

2. The system according to claim 1, wherein the supervisory controller issues control commands to each local controller, the control commands comprising supervisory controller output and an optimal on/off command schedule.

3. The system according to claim 1, wherein the supervisory controller is configured to issue the control commands to the local controllers based on the respective responses of the refrigerated storage containers to local controller control and at least one or more of:

a learned time constant of one of the refrigerated storage containers, a time constant associated with an interaction of a group of the refrigerated storage containers, and knowledge of expected environmental conditions.

4. The system according to claim 1, wherein each refrigerated storage container comprises a cargo space temperature sensor.

5. The system according to claim 1, wherein the supervisory controller is configured to:

determine a correlation between electric power consumption of each refrigerated storage container and a local controller command, and determine an optimal on-off control strategy based on the correlation that satisfies cargo space temperature requirements and minimizes power consumption and short cycling.

6. The system according to claim 1, wherein the supervisory controller is provided as a plurality of supervisory controllers respectively associated with clustered local controllers and corresponding refrigerated storage containers.

7. A method of operating refrigerated storage containers provided on a ship or in a yard, the method comprising:

receiving first data from local controllers of the refrigerated storage containers;

receiving second data from sensors of the refrigerated storage containers;

identifying a correlation between the electric power consumption of the refrigerated storage containers and operations of the refrigerated storage containers from the first and second data; and determining an optimal on-off control strategy for each refrigerated storage container based on the correlation that satisfies cargo space temperature requirements and minimizes power consumption and short cycling, wherein:

the first data comprises condenser air inlet temperature measurements of at least one refrigerated container and operational parameters of at least one refrigerated container, the operational parameters comprise refrigerated container on/off mode information, desired set point information, allowable temperature variability information and ambient temperature information, the second data comprises refrigerated container cargo space controlled temperature information and electrical power draw information, and the method further comprises:

issuing control commands based on the optimal on-off control strategy for each refrigerated storage container to the local controllers; and overriding the control commands, by the local controllers, in an event the control commands conflict with control algorithms resident in the local controllers individually.

8. The method according to claim 7, wherein the determining is further based on at least one or more of:

a learned time constant of one of the refrigerated storage containers, a time constant associated with an interaction of a group of the refrigerated storage containers, and knowledge of expected environmental conditions.

9. The method according to claim 7, wherein the determining comprises determining a correlation between electric power consumption of each of the refrigerated storage containers and local controller control.

* * * * *